Aug. 14, 1956 N. MOURAVIEFF 2,758,481
DEVICES FOR TRANSMITTING ROTARY MOTION
Filed April 20, 1953 5 Sheets-Sheet 1
Fig. 1
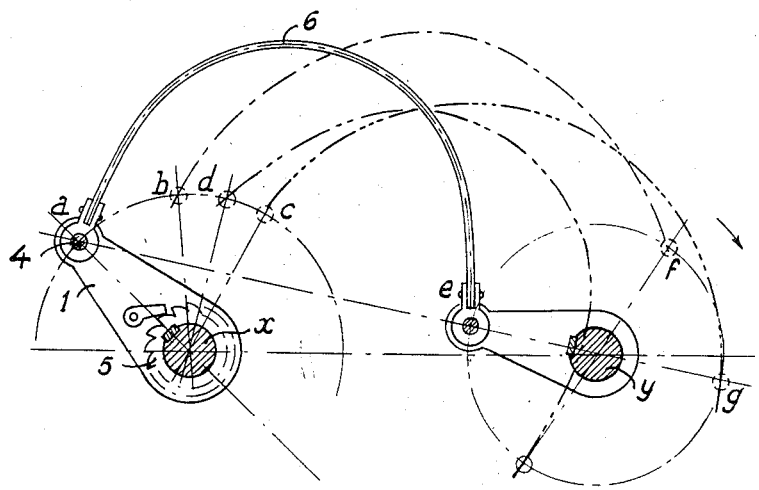
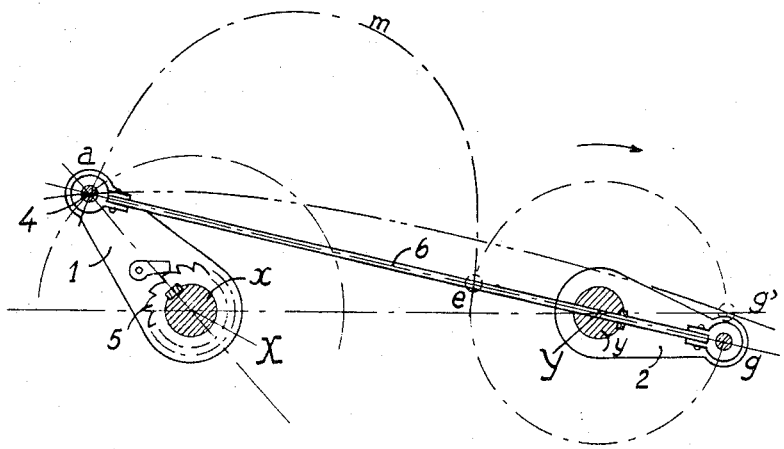
Fig. 2
Inventor
N. N. Mouravieff
By Glascock Downing Seeble
Attys.

Aug. 14, 1956        N. MOURAVIEFF        2,758,481
         DEVICES FOR TRANSMITTING ROTARY MOTION
Filed April 20, 1953                     5 Sheets-Sheet 2
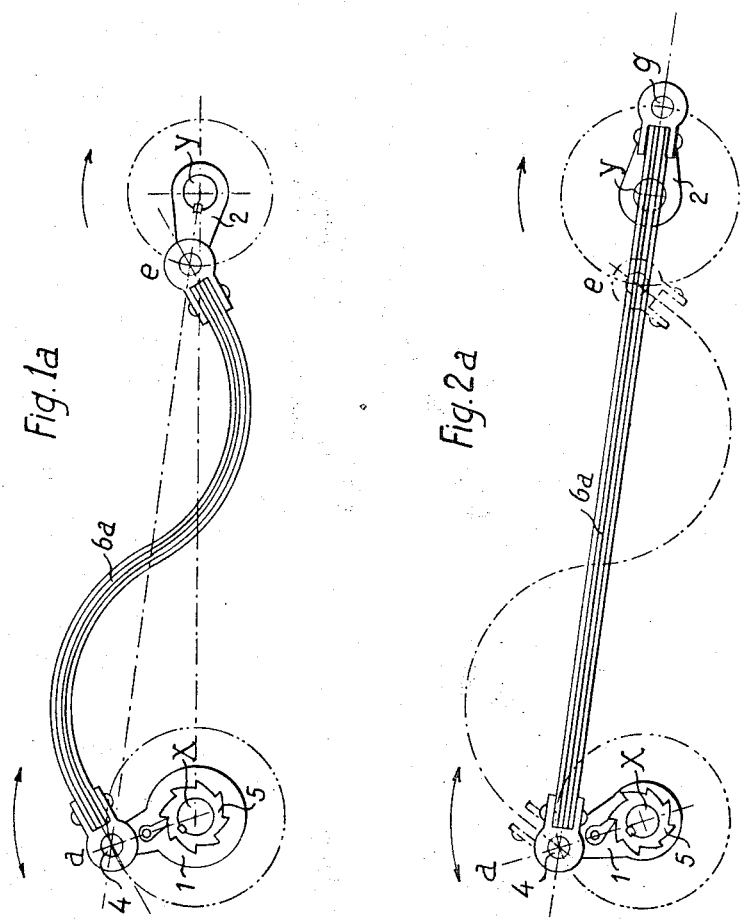
Inventor
N. Mouravieff
By Glascock Downing Seebold
     Attys.

Aug. 14, 1956 N. MOURAVIEFF 2,758,481
DEVICES FOR TRANSMITTING ROTARY MOTION
Filed April 20, 1953 5 Sheets-Sheet 3

Inventor
N. N. Mouravieff
By Glascock Downing Seebold
Attys.

Aug. 14, 1956     N. MOURAVIEFF     2,758,481
DEVICES FOR TRANSMITTING ROTARY MOTION
Filed April 20, 1953     5 Sheets-Sheet 4

Inventor
N. N. Mouravieff

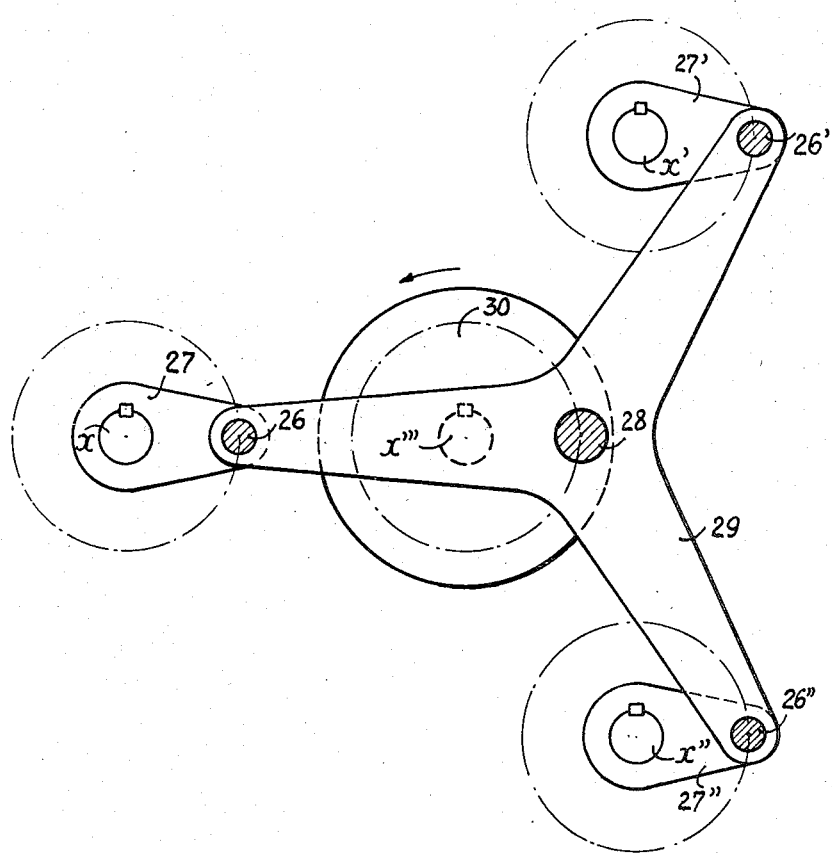

United States Patent Office 2,758,481
Patented Aug. 14, 1956

2,758,481

DEVICES FOR TRANSMITTING ROTARY MOTION

Nicolas Mouravieff, Paris, France

Application April 20, 1953, Serial No. 349,611

Claims priority, application France December 23, 1949

4 Claims. (Cl. 74—116)

The present invention relates to a device for transmitting rotary motion from a driving shaft to at least one driven shaft.

This application is a continuation in part of my prior application Serial No. 202,216 filed December 23, 1950, for "Devices for Transmitting Rotary Motion."

One object of the invention is to provide a transmitting device of this type in which the transmission is ensured by elastic means interposed between the driving shaft and each driven shaft, said means being so designed that, for each value of the driving torque, the speed ratio is a function of the resisting torque thanks to variable deformations of said elastic means.

Another object of the invention is to provide a transmitting device of the type described, comprising a driving crank-shaft and at least one driven shaft parallel to said driving shafts and carrying, through one-way driving means such as free-wheels, crank-members such as crank-arms each located opposite one crank of the driving shaft, in which said elastic means are constituted by a bundle of S-shaped leaf springs interconnecting each crank-pin of the driving shaft with each opposite driven shaft crank-pin.

Thus, each one of said leaf-springs constitutes a tension elastic connecting-rod capable of assuming a variable length depending on the tensile stress exerted thereupon so that, for each value of the driving torque, each complete turn of the driving shaft is transformed into a rotation of each driven shaft which is a function of the resisting torque. In other terms, for each value of the driving torque, the output/input speed ratio is thus a function of the resisting torque.

Thanks to the use of spring-leaves as tension elastic connecting-rods, it is possible, if the same are suitably designed, to avoid any "power slip" or, in other words, to obtain a substantially total transmission of the power of the driving shaft to each driven shaft, even with a high resisting torque.

It would be impossible to meet this condition with usual tension springs such as, viz. coil springs.

It will be easily understood that by a suitable selection of the distance between the above mentioned parallel shafts, the lengths of the crank-arms of the driving and driven shafts, said lengths being either the same or different, and the length, curvature and strength of the leaf-springs, it will be possible to provide a reduction ratio varying in a perfectly progressive manner.

It is also to be understood that the transmission will be smoother if the number of crank-arms of the driving and driven shafts is increased. On the other hand, if the transmitting device is interposed between a piston engine and e. g. the Cardan shaft of a motorcar, it will be possible, by suitably selecting the number of crank-arms and by synchronizing the operation of the device with the timing of the engine to ensure a regulation of the running of said engine, thus improving materially its performance.

Still another object of the invention is to provide a transmitting device of the type described to be used in a motorcar, comprising means interposed between the driving and driven shafts to prevent the latter from rotating at a speed higher than a predetermined speed bearing a given ratio to that of the driving shaft.

A further object of the invention is, in a transmitting device of the type described, to increase the number of leaf-springs so as to reduce the unitary stress transmitted by each of them, without increasing the number of crank-arms of the driving shaft. For this purpose, the motion of the driving crank-shaft is transmitted to a plurality of driven shafts through leaf-springs radially distributed around each driving shaft crank-pin, a leaf-spring being alloted to each driven shaft on each crank-pin of the driving shaft, the motion of said driven shafts being subsequently transmitted, if desired, to one or more additional driven shafts through positive transmitting means such as rigid connecting-rods or the like.

Other objects and advantages of the invention will appear from the following description with reference to the accompanying drawings in which some embodiments of the invention have been shown as a mere illustration.

In these drawings:

Figs. 1 and 2 are explanatory diagrams illustrating the operation of a transmitting device using an elastic connecting rod constituted by an arcuate leaf spring.

Figs. 1a and 2a are similar diagrams corresponding to a transmitting device according to the invention using an elastic connecting rod constituted by a plurality of S-shaped leaf springs.

Fig. 7 is a diagrammatical section of an additional driven shaft coupled through a rigid connecting-rod with the three receiving shafts shown in Fig. 6.

Figure 3:
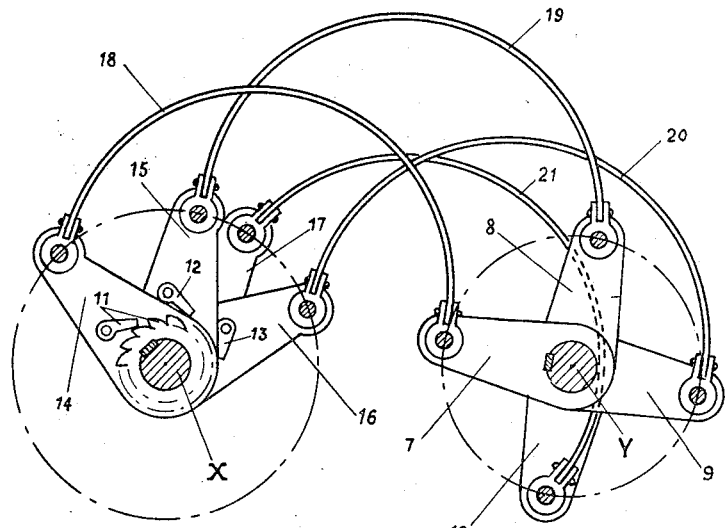
Fig. 3 shows a first embodiment of a device according to the diagrams of Figs. 1 and 2.

In the basic diagram of Fig. 1, $y$ is the driving shaft and $x$ a driven shaft. Driving shaft $y$ is a crank-shaft having a plurality of cranks 2, while driven shaft $x$ carries a number of crank-arms 1, each one of which is located opposite a corresponding crank 2. Crank-arms 1 are mounted on shaft $x$ so as to drive the same in one direction only through one-way driving means such as free-wheel 5.

The crank-pin 4 of each crank-arm 1 is interconnected with the crank-pin 3 of the corresponding crank 2 through a curved leaf-spring 6, the ends of said spring being pivoted on crank-pins 4 and 3, respectively.

This device operates as follows:

In Fig. 1, $a$ is the position assumed by crank-pin 4 when crank-pin 3 is in the position shown at $e$. The prolongation of chord $ae$ of the arc-shaped spring 6 then intersects the axis of shaft $y$. As shaft 1 rotates, each crank-pin 3 describes the circumference shown in dot-dash line around the axis of shaft $y$. When crank-pin 3 describes the angular stroke shown in Fig. 1 as arc $ef$, crank-pin 4 describes e. g. the angular stroke shown as arc $ab$. When crank-pin 3 describes arc $fg$, crank-pin 4 describes arc $bc$. Thus, shaft $y$ has been rotated by 180°, while shaft $x$ has been rotated by a certain angle corresponding to the angular stroke $ac$ of crank-pin 4. After shaft $y$ has run past the dead center corresponding to the maximum tension of the spring, which is the point of intersection of the path of crank-pin 3 and the chord when the same crosses the axis of shaft $y$, said spring further exerts a tensile stress upon crank-pin 4, until said spring has assumed its initial shape again, whereupon crank-pin 4 rotates back through d, thus describing in opposite direction the angular stroke previously described, to come back finally at a when crank-pin 3 comes back at e after having described one complete turn, and so on. Thus, to each turn of shaft y corresponds a certain rotation angle of shaft x, the angular back stroke of crank-arm 1 having no influence upon said rotation, due to the presence of free-wheel 5. When the resistance of shaft x increases, spring 6 is more loaded and thence, further flattened, so that, to each turn of shaft 1 corresponds then a smaller rotation angle of shaft x, while a higher stress is transmitted through said spring from shaft y to shaft x.

In the basic diagram of Fig. 2, the length of spring 6 has been so chosen as to be equal to the chord ae of arc ame corresponding to the shape assumed by the spring, when the same is not subjected to any stress added with eg, i. e. twice the throw Yg of crank-arm 2. Thus, if the resistance of shaft x is very high, e. g. if shaft x is held stationary, when crank-pin 3 reaches point g' in the neighbourhood of point g located on the straight line running through a and axis Y of shaft y, crank-pin 4 of crank-arm 1 is practically remained at point a, so that the spring is substantially flat and acts substantially as a rigid connecting-rod, a theoretically infinite stress being thus applied at a to crank-pin 4. This illustrates clearly the advantages inherent in the use of leaf-springs.

In Fig. 1a, I have shown a modification of the arrangement illustrated in Fig. 1, the difference lying in the fact that the leaf spring, instead of being arcuate, is in the shape of an S. This latter disposition yields better results for the reasons stated hereinafter.

A great flexibility of the connecting rod is essential for a proper operation of the device, but in this condition a single leaf would be most of the time quite unsufficient for the transmission of the torque required and this leads to the necessity of providing a connecting rod constituted by a bundle of superposed spring leaves each having the desired flexibility.

It should be observed, however, that in the arrangement illustrated in Figs. 1 and 2 if it were assumed that the single arcuate spring leaf was replaced by a bundle of spring leaves of substantially same curvature, the outer leaf would have a length slightly greater than that of the inner spring leaf, so that also in the fully stretched position of the connecting rod as shown in Fig. 2, the spring leaves would have different lengths.

According to the arrangement illustrated in Fig 1a, the S-shaped spring leaves have all the same length, which makes it possible for the device to operate in good engineering conditions, providing the surfaces of the leaves in mutual frictionl engagement be properly lubricated, this arrangement permitting to use as many leaves as required, each blade having the thickness which best suits the operating conditions.

In Fig. 3 which shows a practical construction of a device according to the basic principle illustrated in Fig. 1, the driving crank-shaft y has four cranks 7, 8, 9, 10, angularly shifted by 90°. Shaft x carries through free-wheels such as 11, 12, 13, four crank-arms 14, 15, 16, 17. The crank-pins of arms 7, 8, 9, 10 are linked with the crank-pins of arms 14, 15, 16, 17 through curved leaf-springs 18, 19, 20, 21. Each assembly, comprising a crank-arm such as 7, a curved leaf-spring such as 18 and a crank-arm such as 14, operates as described above with reference to Fig. 1.

Figure 4:
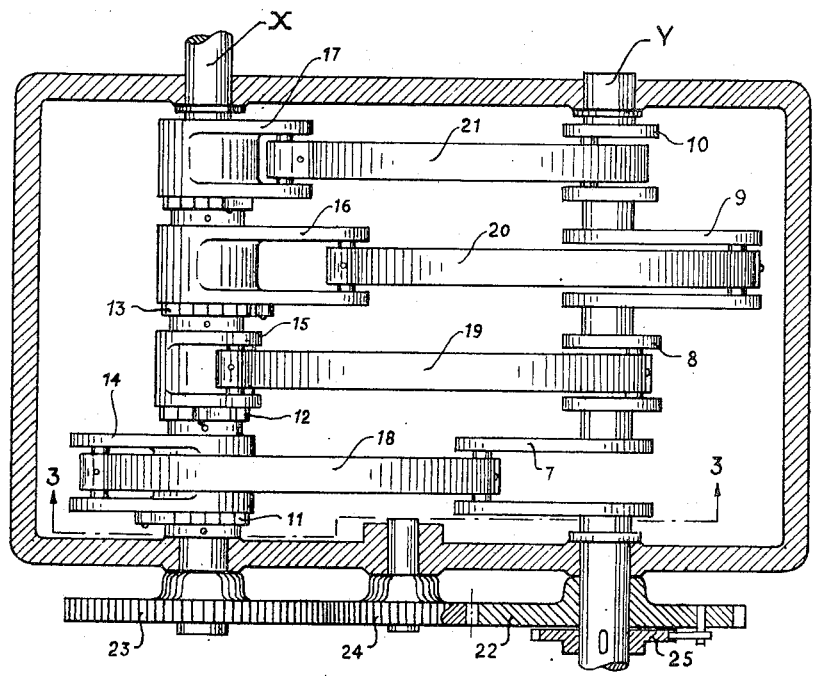
Fig. 4 is a top view showing a practical construction of the device shown in Fig. 3.

In the example shown in Figs. 3 and 4, the driving crank-shaft has four cranks and the transmitting device comprises four elastic connecting-rods. The timings of said connecting-rods being shifted by 90° with respect to each other, the stresses transmitted by each of them are integrated on the driven shaft and the phase-shift of the connecting rods ensures a smooth running. Since the springs, when released, are reset at each turn into their initial position, there is no material loss of power so that substantially the whole power of shaft y is transmitted to shaft x assuming the leaf-springs are suitably selected.

In Fig. 3, the device is shown in its resting position, all springs being released.

Figure 5:
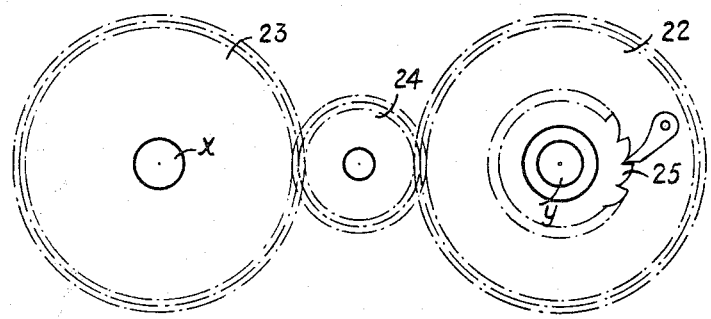
Fig. 5 is a detail view.

In the example shown in Figs. 4 and 5, the driving shaft y is further connected with the driven shaft x through a gear train 22, 23, 24, pinion 22 being rotatively fast with driving shaft y only in the direction in which said pinion drives said shaft through a one-way driving device such as a free-wheel 25, pinion 23 being keyed on the driven shaft x. This arrangement is particularly adapted to be used with motorcars. It permits providing e. g. in steep descents the usual engine-controlled braking of the car.

Figure 6:
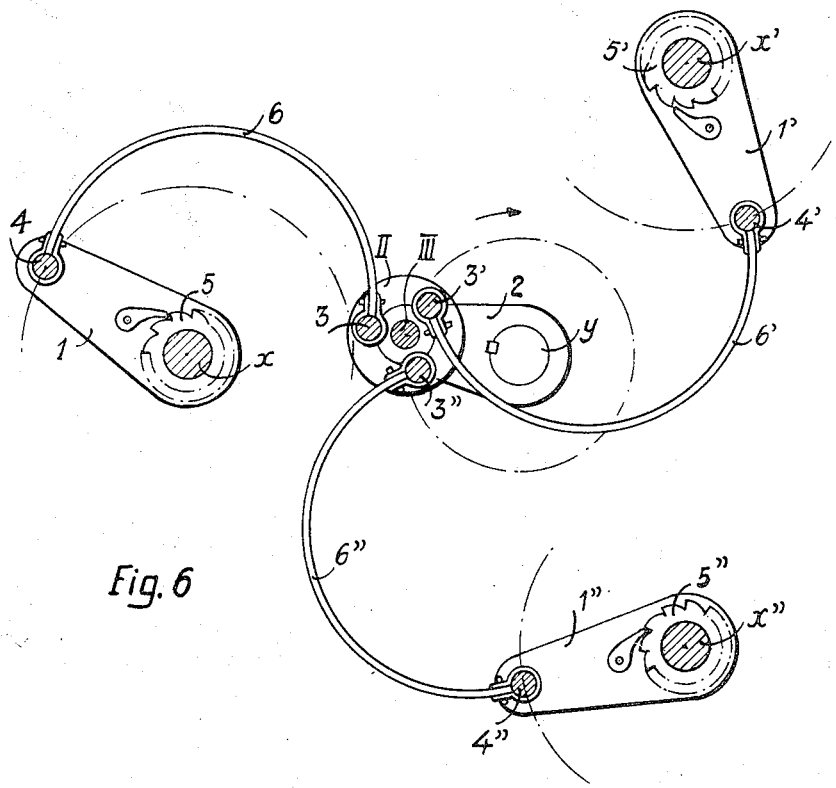
Fig. 6 is a diagrammatical sectional view of another embodiment in which three leaf-springs are radially distributed around each driving shaft crank-pin.

In Fig. 6, y is the driving shaft while x, x' and x'' are three driven shafts. III is a crank-pin of an arm 2 of crank-shaft y. Three arms shown at 1, 1' and 1'' are rotatively fast with shafts x, x', and x'', respectively, in one direction only, through free-wheel devices diagrammatically shown at 5, 5' and 5''. Curved leaf-springs 6, 6' and 6'' pivoted at one end on crank-pins 4, 4' and 4'', respectively, interconnect crank-arms 1, 1' and 1'' with crank-pin III, respectively through a common crank-head II on which the other ends of said leaf-springs are pivoted at 3, 3' and 3'', respectively.

In the example shown in Fig. 7, the three driven shafts x, x' and x'' are positively interconnected with one additional or final driven shaft x''' through a rigid three-arm connecting-rod 29. Said connecting-rod is articulated, on the one hand, on crank-pins 26, 26' and 26'' located on arms 27, 27' and 27'' keyed on shafts x, x' and x'', respectively, and, on the other hand, on crank-pin 28 of an eccentric ring 30 driven by shaft x'''.

In Figs. 6 and 7, the arrows indicate the directions in which the driving and driven shafts are rotating.

The operative elastic connection between each driven shaft x, x', x'' and the driving shaft is the same as in the embodiment shown in Figs. 1 to 5 and the three driven shafts are coupled through connecting-rod 29. This device operates as described with reference to the first embodiment, assuming the same comprises one single shaft driven by three springs 6 each articulated on one arm of a driven crank-shaft, the three crank-arms being shifted by the same angle as the three driven shafts of the embodiment shown in Figs. 6 and 7.

Of course, the scope of the invention would not be departed from if, in the embodiments of Figs. 3 to 7, the arcuate springs were replaced by leaf springs each constituted by a bundle of individual leaves having the shape of an S as shown in Fig. 2a.

It is to be understood that the transmitting device according to the invention is in no way limited to the number of arms of the driving crank-shaft nor to the number of intermediate driven shafts between the driving and final driven crank-shafts. The intermediate driven shafts may also be linked by groups with two or more final driven shafts, independently driven, instead of being linked with one single final driven shaft as described above. This latter arrangement permits avoiding the use of the device known as a "differential" and could be used in a motorcar, for instance, when four or more independent driving shafts are to be provided.

What is claimed is:

1. A device for transmitting rotary motion from a driving crank shaft to a driven shaft parallel to said driving shaft, comprising a rock arm rockable on said driven shaft, a tension elastic connecting-rod interposed between said driving shaft and said driven shaft and constituted by at least one spring leaf pivoted at one end to said rock arm and at the other end to a crank-pin of said driving shaft, said spring leaf being S-shaped in unstressed condition and a free-wheel mechanism interposed between said rock arm and said driven shaft.

2. A device for transmitting rotary motion from a driving crank shaft to a driven shaft parallel to said driving shaft comprising a rock arm rockable on said driven shaft, a tension elastic connecting-rod interposed between said driving shaft and said driven shaft and constituted by a plurality of superposed spring leaves of equal length, each of said spring leaves being S-shaped in unstressed condition and pivoted at one end to said rock arm and at the other end to a crank-pin of said driving shaft and a free wheel mechanism interposed between said rock arm and said driven shaft.

3. A device for transmitting rotary motion from a driving crank shaft to a driven shaft parallel to said driving shaft, comprising a rock arm rockable on said driven shaft, a tension elastic connecting-rod interposed between said driving shaft and said driven shaft and constituted by a plurality of superposed spring leaves of equal length pivoted at one end to said rock arm and at the other end to a crank-pin of said driving shaft, each of said spring leaves being S-shaped in unstressed condition, a free-wheel mechanism interposed between said rock arm and said driven shaft, and a gear including free-wheel means interposed between said driven shaft and said driving shaft to prevent said driven shaft from rotating at a speed higher than a well defined speed bearing a given ratio to the speed of said driving shaft.

4. A device for transmitting a rotary motion comprising a driving crank shaft, a driven shaft parallel to said driving shaft, one-way driving means to rotate said driven shaft, said means including a crank member located opposite each crank of said driving shaft and at least one S-shaped leaf-spring both ends of which are provided with articulation means having their axes substantially in the planes tangent at said ends to the mid-thickness surface of the spring and the curvature of which is such that its length taken between the axes of said articulation means is at most equal to the distance between said axes when said spring is subjected to no stress added with twice the length of said driving shaft crank, said device further comprising a gear including free-wheel means interposed between said driving shaft and said driven shaft to prevent the latter from rotating at a speed higher than a well-defined speed bearing a given ratio to that of said driving shaft, said articulation means being pivoted, on the one hand, on said driving shaft crank and, on the other hand, on said driven shaft crank member so that said spring acts as a tension elastic connecting-rod therebetween and so that each complete turn of said driving shaft is transformed into a rotation of said driven shaft by an angle which is a function of the resisting torque, whatever may be the value of the latter within the limits of elasticity of said spring.

References Cited in the file of this patent

UNITED STATES PATENTS

| 158,571 | Chandler | Jan. 12, 1875 |
| 280,902 | Blood | July 10, 1883 |
| 299,150 | Leavitt | May 27, 1884 |
| 1,557,432 | Defordt | Oct. 13, 1925 |
| 2,023,579 | Dodge | Dec. 10, 1935 |
| 2,176,381 | Shaw | Oct. 17, 1939 |

FOREIGN PATENTS

| 317,000 | Great Britain | Mar. 20, 1930 |
| 342,415 | Great Britain | Feb. 5, 1931 |
| 812,116 | France | Apr. 30, 1937 |